Jan. 26, 1960  C. J. BOGERT, SR  2,922,263
CONVEX FORM TOOL GRINDING AND CAM GENERATOR AND METHOD
Filed Sept. 4, 1956  4 Sheets-Sheet 1

INVENTOR
Cornelius J. Bogert Sr.
BY
Mooster & Davis
ATTORNEYS.

Jan. 26, 1960  C. J. BOGERT, SR  2,922,263
CONVEX FORM TOOL GRINDING AND CAM GENERATOR AND METHOD
Filed Sept. 4, 1956  4 Sheets-Sheet 2
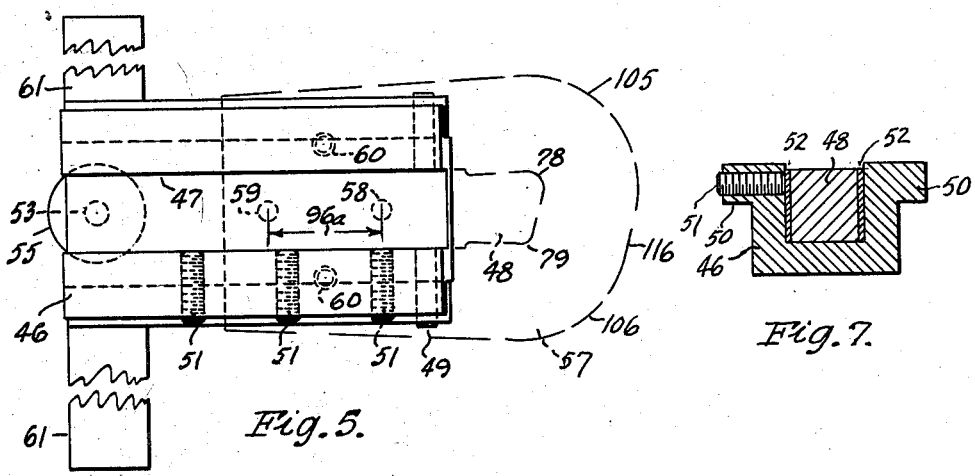
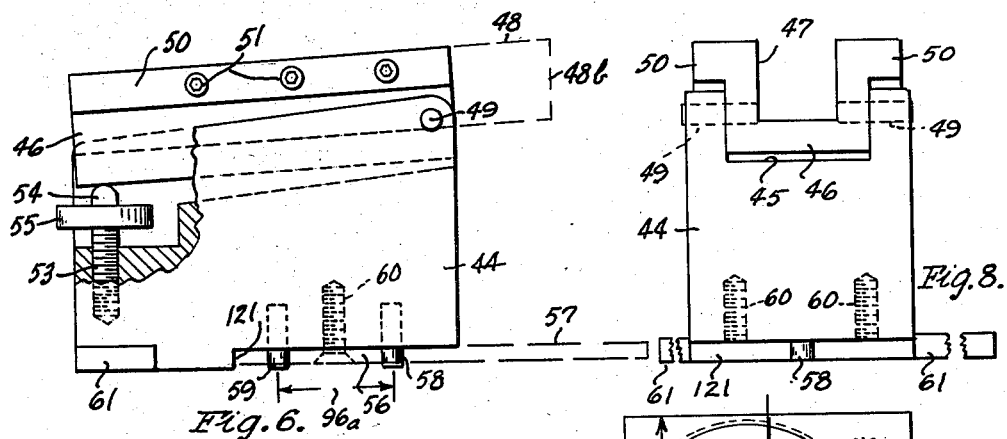
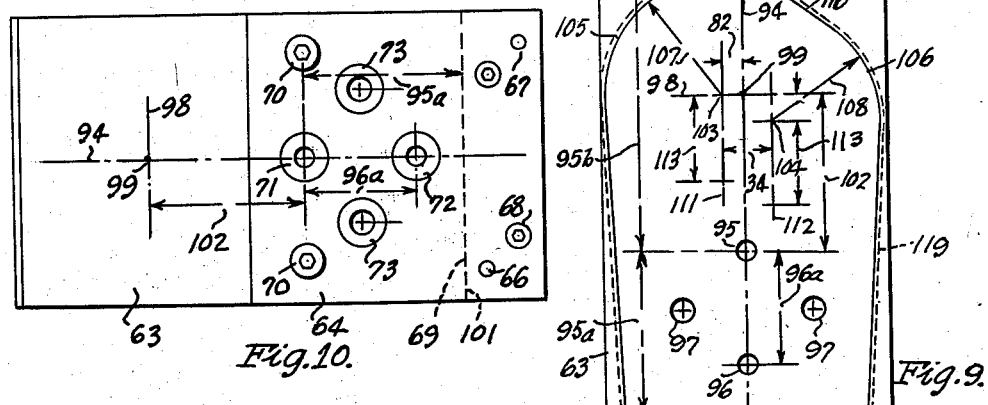
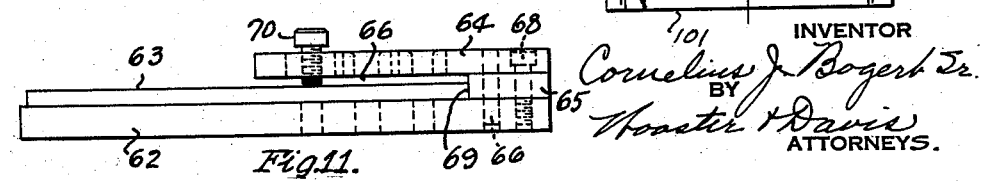
INVENTOR
Cornelius J. Bogert Jr.
BY
Hoester & Davis
ATTORNEYS.

Jan. 26, 1960     C. J. BOGERT, SR     2,922,263
CONVEX FORM TOOL GRINDING AND CAM GENERATOR AND METHOD
Filed Sept. 4, 1956     4 Sheets-Sheet 4

INVENTOR
Cornelius J. Bogert Sr.
BY
Wooster Davis
ATTORNEYS.

United States Patent Office 2,922,263
Patented Jan. 26, 1960

2,922,263

CONVEX FORM TOOL GRINDING AND CAM GENERATOR AND METHOD

Cornelius J. Bogert, Sr., Stratford, Conn.

Application September 4, 1956, Serial No. 607,822

6 Claims. (Cl. 51—224)

This invention relates to a method and apparatus for grinding cutting tools or tool bits for machine tools, and has for an object to greatly simplify and improve the method of forming and grinding these cutting tools, and also an improved method of regrinding such tools whereby all tools of the same size and shape may be ground alike and the initial shape or form may be accurately maintained throughout the life of the tool.

Another object is to provide a method and means whereby not only may the tool be accurately reground to maintain its original form or shape, but this may be done in much less time than by the usual method, effecting a great saving in time required for these operations.

Another object is to provide an improved method and means for making and regrinding all high speed steel tools, tungsten tools, and carbide tip tools.

Another object is to provide a method and means whereby may be salvaged tool bits that were previously scrapped, and these scrapped bits used to create new tools.

With the foregoing and other objects in view, I have devised the novel method with means by which it may be accomplished as illustrated in the accompanying drawings forming a part of this specification. It is, however, to be understood the invention is not limited to the specific details shown or described, but may embody various changes and modifications within the scope of the invention.

In these drawings:

Fig. 5 is a top plan view of a tool holder which may be used for carrying out this method;

Fig. 6 is a side view looking toward the bottom of Fig. 5;

Fig. 7 is a transverse section of the adjustable tool holding member or jaw of this holder;

Fig. 8 is an end view of the holder looking from the right of Fig. 6;

Fig. 9 is a plan view of a cam blank from which may be formed the cam used for controlling the grinding of the tool according to this method;

Fig. 10 is a plan view of a drill jig which may be used for locating, drilling and reaming the cam locating holes and associated anchor holes for properly and accurately locating and positioning the cam on the tool holder during the tool grinding operation;

Fig. 11 is a side view thereof looking toward the bottom of Fig. 10;

This method was developed for the purpose of accurately controlling convex form tool grinding, and also greatly facilitating the forming and grinding of such tools to thus maintain the accuracy throughout successive grinding operations, and also to greatly reduce the time required for performing these operations.

With all the improvements made for removing metal in a machine tool operation in the last decade, hardly anything has been accomplished in improvements for the grinding of turning, boring and standard form tools. A few devices to hold the tool while grinding have been developed, but still they are practically the same as used from the day the tool bit was first developed. Manufacturers and engineers have made great progress in the development of machines and holding devices, and have built special machines for grinding special forming tools, hobs and so forth, yet sixty-five percent of the tools used in the industries are standard tools, and hardly any improvement in the method of grinding them has been made. The tool bit is the most important factor in these industries, it being used to do three things, (1) remove the metal, (2) hold the size and (3) retain the finish. With this new method and development it becomes a simple matter to make and maintain these tools, since once the cam for a particular tool has been developed it is possible to make as many tools as desired accurately to the same form, size or shape, and to also regrind these tools when necessary and accurately maintain this form or shape throughout the life of the tool. With this method, when tools are to be reground all the operator need to do is get the proper cam from the tool crib with all the information he may need printed on the cam, such as tool number, primary angle, secondary angle, and radius. This as compared to the old method is a great time saver and also insures uniform operation and results, in that in the old methods an operator regrinding any tool regardless of shape, either a single point or formed tool, has had to secure a blue print for each and every tool from the tool crib and work from it. With this method, wasted time is eliminated as a blue print is used only when forming a new cam for grinding or forming a particular tool.

Figure 1:
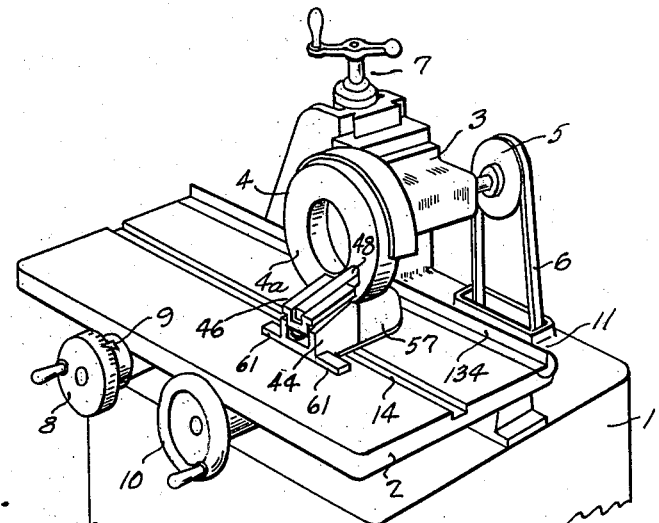
Fig. 1 is a perspective view showing somewhat diagrammatically a common form of grinder which may be used for grinding a tool, and also for grinding the cam used for controlling the grinding of the tool.

In the drawings are shown devices which may be used for carrying out this method. Fig. 1 shows somewhat diagrammatically one form of grinder which may be used for grinding both the control cam and the tool bit. That shown comprises the usual bed or base 1, the adjustable and movable work-supporting table 2, and the vertically and horizontally adjustable head 3 carrying the shaft on which is mounted a suitable form of grinding wheel 4 driven by any suitable drive, such, for example, as a pulley 5 operated by a belt 6 from any suitable type of motor (not shown). Means for vertically adjusting the head 3 is shown at 7, with a cross feed or horizontal adjustment for this head indicated at 8, which may have a micro dial setting, as indicated diagrammatically at 9, and means for setting the angle of the table 2 indicated at 10. This figure also shows diagrammatically a guide rail 11 which is square with the top of the table 2 at all times and is used in certain steps of this method, as will later be described.

Figure 2:
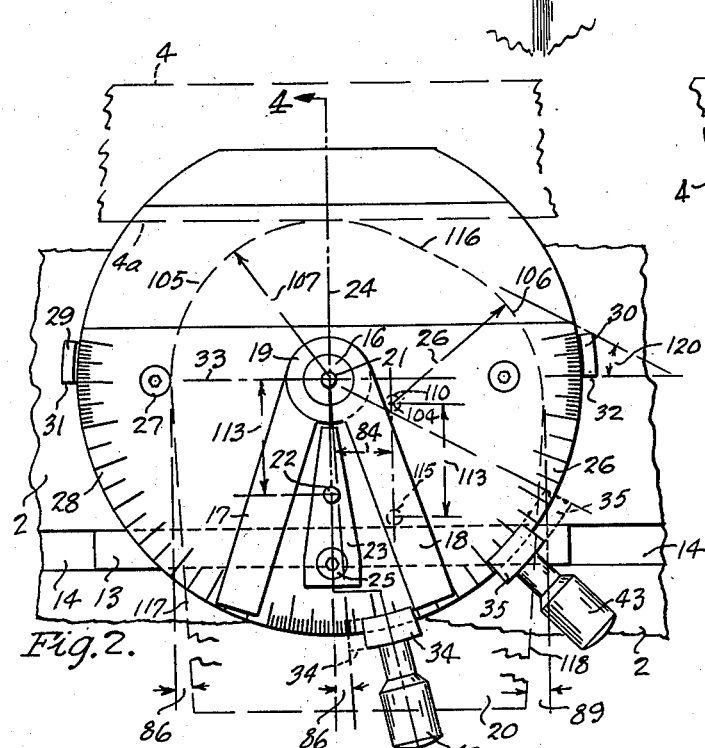
Fig. 2 is a top plan view of an improved form of cam generator which may be used for accurately grinding the shape of the control cam used in this method.
Figure 3:
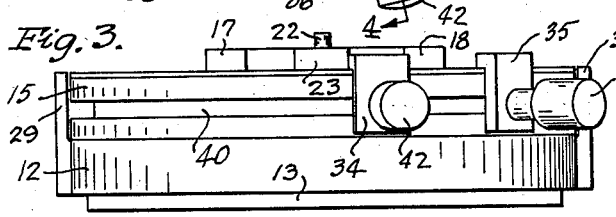
Fig. 3 is a side elevation looking toward the bottom of Fig. 2.
Figure 4:
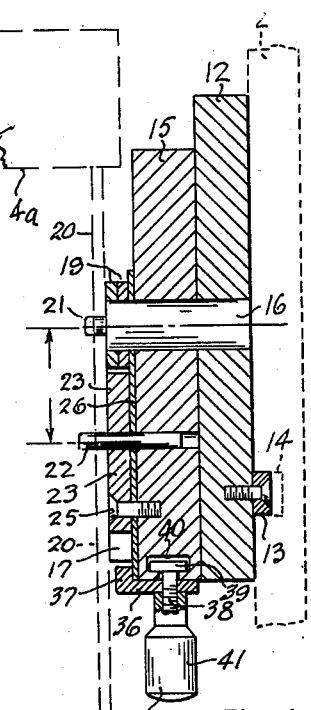
Fig. 4 is a vertical section substantially on line 4—4 of Fig. 2.

As previously suggested, a cam is formed for controlling the grinding of the tool or bit. In Figs. 2, 3 and 4, is shown a construction of a cam generator which may be used to facilitate the accurate forming and grinding of this cam. It comprises a base 12 adapted to be supported on the table of a grinding machine such, for example, as the table 2 of Fig. 1, and may be positioned on this table by means of a guide in the form of a bar 13 secured to the under side of the base and adapted to fit and be guided for longitudinal movement in a channel 14 in the top of this table. Pivotally mounted on the base 12 is a member 15 which may be called a generating table, and is mounted on the base 12 for turning movement by means of a central pivot pin 16, which also projects above the top of the table 15 and provides a pivot for a pair of cam supports 17 and 18, which in the form shown comprise arms projecting radially outward from the pivot pin 16 and have overlapping heads 19 of substantially half the thickness of the arms 17 and 18 so that the level of the top surface of the upper arm is in a single plane with the top of the other arm, but permits these arms 17 and 18 to be individually adjusted in position about the pivot pin 16 to properly locate them for supporting a cam to be ground, indicated by the broken lines 20.

Projecting upwardly from the top of the pivot pin 16 and axially on the same center therewith is a smaller pin 21, which for identification is termed a cam locating pin used in properly positioning the cam on the generator, as will later be described. A similar locating pin 22 is mounted in the table 15 and passes through a third supporting block or member 23 for the cam which is accurately located on the vertical center line 24 passing through the locating pin 21 and the pivot pin 16, this auxiliary support and the member 23 being located between the supporting arms 17 and 18 and secured in position by the pin 22 and a screw 25. On the top of the table 15 and between this table and the cam supports 17, 18 and 23 is a gauge or scale plate 26 secured to the table 15 by any suitable means, such, for example, as the screw 25 and screws 27, this plate having adjacent its outer edge a suitable angle or degree scale 28 used in controlling the grinding and forming of the cam, as will presently be described.

Located on diametrically opposite sides of the table 15 are a pair of stops 29 and 30 located with their forward edges 31 and 32 on the horizontal diameter 33 extending through the center 16 and the cam locating pin 21. Also mounted on the outer circular edge of the table 15 are two angle stops 34 and 35 which are mounted so that they may be adjusted to different positions on the outer periphery of the table 15 as determined by the scale 28 and secured in these positions. These stops in the form shown are of the same construction, the stop 34, for example, comprising an angle member including an upright body portion 36 and a top flange 37 overhanging the top of the scale 26 and a headed screw 38 having a head 39 running in a T-slot 40 in the peripheral edge of the table 15 and provided with a threaded shank 41 on which is a clamp and finger grip 42 for the clamp 34, and 43 for the clamp 35. This threaded shank passes through the portion 36 of the clamp, and by setting up the grip 42 or 43 after adjustment of the associated clamp to the desired position on the table 15 it may be clamped securely in this position. These finger grips 42 and 43 may be used to turn the table 15 carrying the cam to shift it during the grinding operation, as will presently be described.

In Figs. 5 to 8 is shown a tool holder which may be used for forming and grinding a tool by this method. It comprises a base block 44 having a longitudinal channel 45 in its top surface in which is pivotally mounted a tool holding member or jaw 46. This member is substantially U-shaped in cross section, as shown in Figs. 7 and 8, with a longitudinal channel 47 open at the top in which may be placed and secured the tool blank 48 which is to be ground. This holding member fits between the side walls of the channel 45 of the base black, and it is pivoted adjacent its forward end for up and down tipping movements by suitable pivot pins 49 extending through the side walls of the members 44 and 46. The member 46 may also have longitudinally and laterally extending ribs or flanges 50 at their upper edges in which may be provided suitable clamping screws 51 for clamping the tool 48 to be ground. Tools of different widths may be located and clamped in this holding member by using suitable tool spacer blocks 52 of suitable thickness on opposite sides of the tool to properly center the tool in the holding member. Means is also provided for adjusting the angle of the holding member 46 about the pivots 49, in this case comprising an adjusting screw 53 in the opposite end of the channel 45 and engaging at its upper end 54 the under side of the member 46, and provided with a roughened or knurled flange or grip 55 for adjusting the screw and the angle of the tool or bit 48 for the grinding operation, and grinding the proper clearance angle on the end of the bit. On its lower side the base or block 44 is provided with a recess 56 in which the controlling cam, shown by the broken lines 57, is located, and properly positioned by the cam locating dowel pins 58 and 59. It is secured on the under side of the member 44 in this recess and on these pins by suitable screws 60 passing through the cam. At its opposite ends this block 44 may be provided with laterally extending bars 61 to rest on the top of the table 2 of the grinding machine, to give the holder lateral stability and also to properly level it on the table 2 during the grinding operation.

In Figs. 10 and 11 is shown a drill jig to facilitate locating, drilling and reaming, locating holes in the cam blank for use with the locating dowel pins 58 and 59 for positioning the cam on the tool holder, and also drilling anchor holes for the anchoring screws 60 used to anchor or secure the cam on the bottom of the tool holder. This drill jig as shown comprises a base plate 62 which is the same width as a cam blank to be drilled, indicated at 63, and a top member 64 spaced above the base member 62 by a spacing member 65 of suitable thickness to space the plate 64 the proper distance above the member 62 to provide a space 66 for insertion of the cam blank during the drilling and reaming operation. The upper plate 64 may be positioned and secured by suitable dowel pins 67 mounted in the lower member 62 and passing through the members 64 and 65, with suitable screws 68 securing these members together. The forward or inner edge 69 of the spacer member 65 may act as a locating stop or shoulder to be engaged by one end of the cam blank 63 to locate it centrally in this jig, after which it may be clamped in position for the reaming and drilling operations by any suitable clamping means, such, for example, as the screws 70 in the upper member 64. For properly locating and drilling and reaming the locating holes in the cam blank for the locating dowel pins 58 and 59, the upper member 64 is provided with properly located and similarly spaced tubular guides or eyelets 71 and 72 for guiding the drill and reamer for the openings for the locating dowel pins. Similar tubular guides or eyelets 73 properly located and spaced are provided for drilling the holes 97 for the anchoring screws 60.

Figure 12:
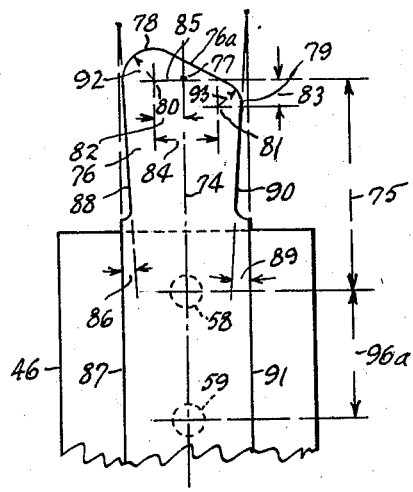
Fig. 12 is a top plan view of one form of typical tool or tool bit used to illustrate the carrying out of this method and showing it mounted in the adjustable holding member or jaw of the tool holder in which it is held for the grinding operation.

In carrying out this method, a suitable cam blank 63 of proper size and thickness, and preferably square or rectangular in shape, of any suitable material such, for example, as a compressed fiber or reinforced plastic material, or it could be metal if preferred, is used. We will assume for the purposes of illustration that a typical cutting tool or tool bit of the shape of Fig. 12 is to be formed or ground. A drawing and blue print of this tool is made similar to Fig. 12, indicating the shape and the dimensions of this bit or tool, giving the longitudinal center line 74, and the location of the cam locating dowel pin 58 located on this center line. Also located on this center line and spaced from the center of this pin 58 any suitable distance 75, which may be arbitrarily chosen to suit the tool to be ground and depending on the amount the end of the tool to be ground is to project beyond or overhang the tool holder during the grinding operation, as indicated by the broken lines 48 in Figs. 5 and 6, is located the zero point 77. For purposes of illustrating the operation of grinding the particular shape of tool shown we will assume this distance 75 is one inch, although as indicated other arbitrary distances may be used if desired. As in this particular shape of tool two curved corner portions or edges 78 and 79 are to be ground the centers 80 and 81 respectively for the arcs of these curves are located at their proper distances from the zero point 77, as indicated by the dimensions 82, 83 and 84. In this case the center 80 is on the same transverse line 85 as is the zero point 77 but spaced laterally to one side of the center line 74 by the distance 82. The other center 81 in this particular tool is located inwardly of the center 77 at a distance 83 and spaced laterally from the center 80 by the distance 84, thus bringing it on the opposite side of the center line 74. The inclination angle 86 with respect to the center line 74, or the side 87 of the tool, is also indicated for the side 88, as well as the inclination angle 89 for the opposite side 90 with respect to the center line 74, or the opposite side 91 of the bit. The radii 92 and 93 of the curved edges 78 and 79 respectively are also indicated, and it is assumed in this illustration that the radius 92 is one-quarter inch and radius 93 three-sixteenths inch.

This drawing therefore gives the various dimensions as well as the shape of the finished tool to be formed and ground. The outline of a cam similarly shaped but of larger size, depending on the arbitrarily chosen distance 75, is drawn or scribed on the surface of the cam blank 63, as shown in Figs. 9 and 13, as well as holes drilled and reamed for cooperation with the locating dowel pins 58 and 59 on the tool holder, the anchoring screws 60 on this holder, and locating holes for cooperating with the locating pins 21 and 22 on the cam generator for locating the cam during the grinding of the outline of the cam.

In carrying out these operations of properly forming and grinding the cam, for controlling the grinding of the tool, the first step is to scribe the longitudinal center line 94 on the cam blank. This may be done by placing the cam in vertical position on one longitudinal edge on a surface plate, and then using a surface gauge and scribe to accurately locate and scribe this center line on the blank. Then the blank is placed in the drill jig as shown in Figs. 10 and 11, with its lower end against the locating shoulder 69 and this center line 94 accurately located under the eyelets or drill guides 71 and 72, and the blank clamped in this position by the clamping screws 70. Then the locating dowel pin holes 95 and 96 are drilled and reamed through the eyelets 71 and 72 accurately on the center line 94. The distance of locating dowel pin hole 95 from lower edge 101 of the cam blank indicated at 95a is the same as that of dowel pin 58 (Fig. 6) from the shoulder 121 on the base of the tool holder, and the distance 96a between the holes 95 and 96 is the same as that between the pins 58 and 59. Pin hole 95 in the example chosen is two and one-half inches from the top edge of the cam blank, as indicated by 95b. The holes 97 for the anchoring screws 60 may also be drilled in this jig through the eyelets or guides 73.

The cam blank may now be removed from the drill jig and the transverse line 98 scribed on it to locate the zero point 99 corresponding to the zero point 77 on the drawing of the tool bit, this being spaced from dowel pin opening 95 the distance 102 corresponding to the arbitrarily chosen distance 75 (Fig. 12) or one inch in the example being used for illustrating this method. This line 98 may be scribed by placing the blank in an upright position on its lower edge 101 on the surface plate and using the surface gauge and scribe to locate this line at the proper distance 102 above the center of the locating hole 95, it being held in an upright position against the face of a suitable gauge or angle block seated on the surface plate, or a four-inch square block with a dowel pin located in its exact center and a second dowel pin vertically spaced below it corresponding with the spacing of the drilled openings 95 and 96, may be used to hold this blank in the proper upright position for scribing this transverse line 98 at the proper distance 102 above the hole 95. Then the centers 103 and 104 are located on the cam blank to correspond respectively with the centers 80 and 81 on the tool, and the outer curves 105 and 106 of the cam are struck from these centers, the radii 107 and 108 of these curves being the respective radii 92 and 93 plus the one inch adopted for the distance 75, so that the radius 107 for the arc 105 would thus be one and one-quarter inch, while the radius 108 for the arc 106 would be one and three-sixteenths inch. These arcs may be struck from the centers 103 and 104 directly on the cam blank, or if the locating holes 109 and 110 are first drilled on these centers, a center plug may be inserted in the hole and the arc struck from the center of this plug. Lines 111 and 112 are also drawn through the centers 103 and 104 parallel to the center line 94 and spaced on the opposite sides thereof and from each other the distances 82 and 84 corresponding to the spacing of the centers 80 and 81 on the tool. Also located and drilled on these lines and at the proper distance 113 from the respective holes 103 and 104 are the second locating holes 114 and 115, the distances 113 between each of these pairs of holes corresponding to the distance between the locating pins 21 and 22 on the cam generator (Figs. 2 and 4). The connecting line 116 between the arcs 105 and 106 may also be scribed, and the side lines 117 and 118 at the same angles 86 and 89 respectively of the sides 88 and 90 of the tool bit may also be scribed, but spaced laterally from the center line 94 to correspond with the spacing of the sides 88 and 90 from the center line 74 of the tool, plus the amount chosen for the distance 75, in this case one inch.

Figure 13:
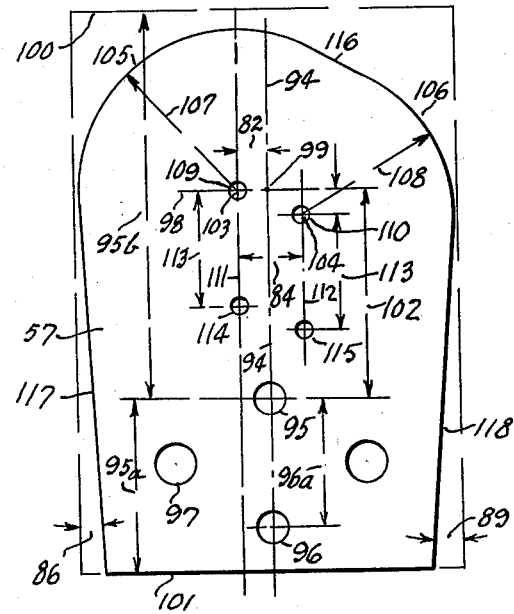
Fig. 13 is a plan view of a cam used for controlling the making and grinding of the tool of Fig. 12.

The cam blank is now ready for grinding to form the cam thus outlined in full lines in Figs. 9 and 13. The blank may be cut roughly to the shape of this outline on any suitable grinding machine, using a grinding wheel or sanding disc, leaving approximately an eighth of an inch or less, indicated by the broken lines 119 in Fig. 9, outside the finished outline indicated by the full lines, to thus remove the surplus portions of the blank outside the cam outline to be formed. Then this roughly shaped cam blank is ground to the finished size and shape indicated by the cam outline in full lines Figs. 9 and 13, on the cam generator shown in Figs. 2, 3 and 4. This operation may be performed with the grinding machine illustrated in Fig. 1.

In carrying out this operation, to grind the curve 105, for example, this cam blank with the holes drilled in it is placed on the supports 17, 18 and 23 on the table 15 of the cam generator with the locating pins 21 and 22 in the holes 109 and 114 respectively in the cam blank. This locates the cam blank on the pivoted table 15 with the hole 109, the center of which is the center 103 of the arc 105, on the center 21 of the table 15 and the axis of the pivot 16 for this table. The grinding wheel 4 may now be shifted to bring its inner face 4a by means of the setting member 8, using the micro dial setting on this member to properly position the face 4a of the grinding wheel, the proper distance from the center pin 21, in this case one and one-quarter inch. Also stops 34 and 35 are adjusted on the table 15 to cooperate with the stops 29 and 30 to limit opposite turning movements of the table 15 to correspond with the angle 86 for the side 117 of the cam and the angle 120 for the straight connecting side 116 of the cam. Now by turning the table 15 with the cam blank on it clockwise as viewed in Fig. 2, until the left hand end edge of the stop 34 hits the stop 31, the arc 105 may be accurately ground to the outline shape scribed on the cam blank, and then by sliding the cam generator to the right on the table 2 of the grinder in a straight line, it being guided in this motion by the bar 13 in the channel 14 of the grinder table, the straight side 117 of the cam will be ground at the proper angle 86. Turning the table counterclockwise until the end of the stop 35 engages the edge 32 of the stop 30, the other portion of the arc 105 will be completed to the inclined line 116. Then by sliding the cam generator in a straight line to the left, on the table 2, the straight line 116 of the cam may be ground at the proper angle 120.

Now the arc 106 may be ground by removing the cam blank from the pins 21, 22 and replacing it on the table 15 with the pins 21 and 22 in the drilled holes 110 and 115. This locates the center of pin 21 on the center of the arc 106, and the right hand stop clamp 35 is adjusted to correspond with the angle 89 desired for the right hand straight side 118 of the cam. Then by rotating the table 15 to the left or counterclockwise until the stop 35 engages the stop 30, the arc 106 of the cam is ground, and then by shifting the cam generator a straight line to the left, it being again guided in this straight line by the bar 13 in the channel 14, the straight side 118 of the cam is ground at the proper angle 89.

Figure 16:
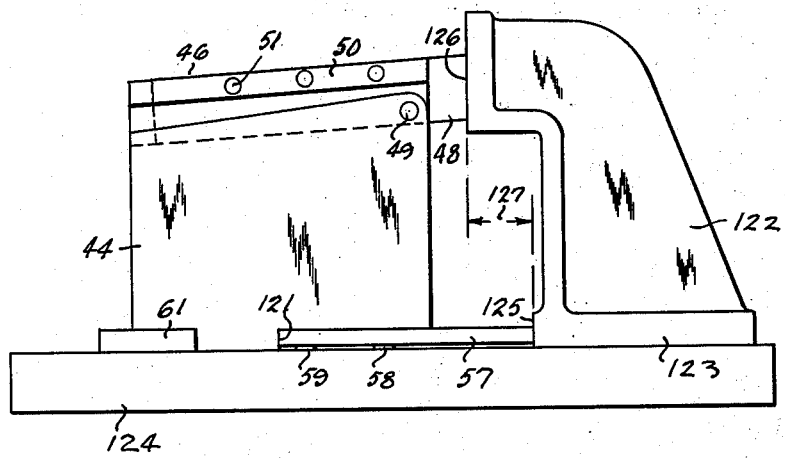
Fig. 16 is a side view showing the operation of locating the tool in the holder preparatory to the grinding operation.

The cam is now ground complete to the proper size and shape as indicated by the full outline in Fig. 13, to correspond with the scribed outline on the cam blank shown in full lines in Fig. 9, and may now be used for grinding the tool or tool bit 76. This is done with the tool holder of Figs. 5 to 8 used with the grinding machine of Fig. 1. In carrying out this operation, we may first grind the arc 78 on the tool. The finished cam of Fig. 13 is mounted on the under side of the tool holder and located thereon by the locating dowel pins 58 and 59 in the openings 95 and 96 respectively on the cam, and with its inner edge 101 against the shoulder 121 of the tool holder, and anchored or fastened in this position by the anchoring screws 60. Then the tool blank 48 is placed in the holding member 46 of the tool holder and its outer free end 48b is located at one inch inwardly from the outer edge of the cam to correspond with the arbitrarily chosen distance 75 of Fig. 12, and this location may conveniently and quickly be made as shown in Fig. 16, by using a setting gauge 122 having a base 123 to seat on a surface plate 124, the base 123 provided with a vertical gauge surface 125, and this setting gauge provided with another vertical surface 126 spaced above the table 123 to correspond with the height of the tool blank above this plate and spaced forwardly from the surface 125 a distance of one inch indicated at 127 corresponding to the distance 75 (Fig. 12) originally chosen. This properly locates the free forwardly projecting end of the tool with respect to the free projecting edge of the cam, and the tool is then clamped in this position, and the tool and the cam are now in position for properly forming and grinding the tool bit.

Figures 17, 18:
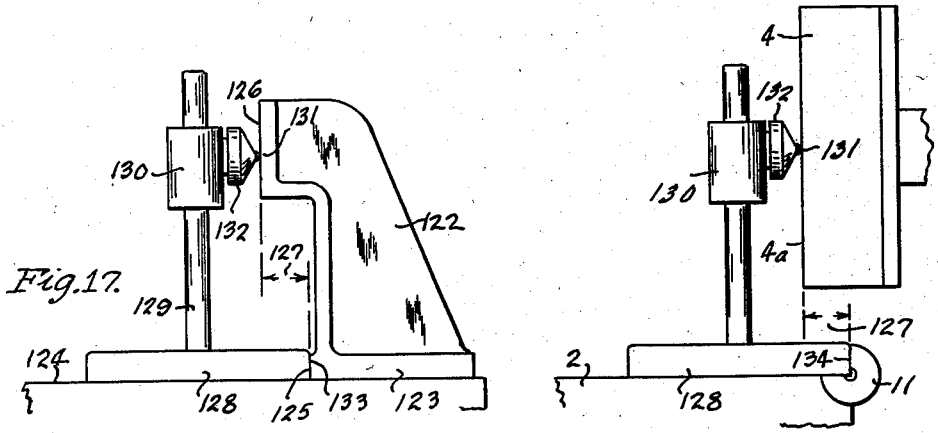
Fig. 17 is a similar view showing the means of positioning or setting the diamond dresser for the grinding wheel.
Fig. 18 is a similar view showing the use of the properly set diamond dresser as used in dressing the surface of the grinding wheel.

The grinding wheel 4 of the grinding machine of Fig. 1 is properly positioned and dressed with respect to the guide rail 11 by the means indicated diagrammatically in Figs. 17 and 18. A diamond dresser comprising a base 128 and an upright post 129 on which is adjustably mounted a supporting member 130 for the diamond 131 for dressing the surface of the wheel 4, the diamond being supported in a head or holder 132 mounted in the vertically adjustable member 130 for in and out or lateral adjustment, is placed on a surface plate 124, and the diamond dresser and the setting gauge 122 are placed with the vertical surface 125 of base 123 against the forward edge 133 of the base 128. Then the diamond 131 is adjusted to just contact the upper surface 126 of the gauge, which action therefore locates this diamond one inch backwardly from the surface 133 corresponding to the spacing 127, which also corresponds with the arbitrarily chosen distance 75. Then by placing the forward edge 133 of the base of the diamond dresser against the upright edge 134 of the guide rail 11, the diamond is located one inch or the distance 127 from this guide surface of the rail, and then by bringing the grinding wheel forwardly its forward grinding face 4a may be dressed to be exactly one inch, as indicated by the space 127, from the surface 134 of the guide rail 11.

Now by placing the tool holder with the finished cam 57 secured to the under side thereof, as previously indicated, and the tool blank 48 secured in the pivoted holding member 46 (it of course having been adjusted to the proper angle desired for the upright free face 48b of the tool bit) on the surface of the table 2, and bringing the outer free edge of the cam against the upright guide surface 134 of the guide rail 11, the tool holder may be turned and shifted while maintaining the finished edge of the cam against this rail in position with the free end of the tool bit against the face of the properly dressed grinding wheel 4. With this action the free end of the tool or tool bit is ground to the outline shape shown in Fig. 12, to correspond with the shape of the cam, but as it is spaced one inch away from the guide surface 134 of the rail 11 it is ground to the arcs 78, 79 on radii one inch smaller than the radii 107 and 108 of arcs 105 and 106 of the cam. Similarly, the straight sides 88 and 90 and the connecting straight portion 76a are ground to correspond to the angles of inclination of the straight lines 117, 118 and 116 respectively of the cam.

Thus the tool or tool bit may be accurately ground to correspond with the shape on the cam, and very quickly, with a simple operation of causing the cam and the tool to be guided by the upright guide rail 11, and after one tool is ground another tool, or as many as desired, may be similarly ground to exactly the same size and shape.

Figure 14:
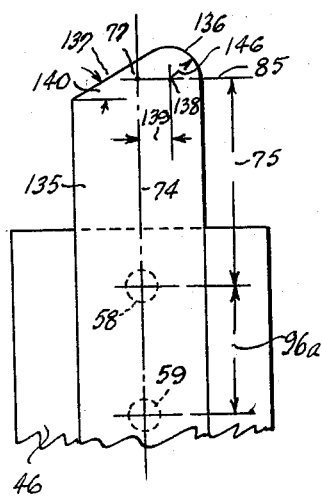
Fig. 14 is a view similar to Fig. 12 showing for illustration another shape of tool which may be formed and ground by this method.
Figure 15:
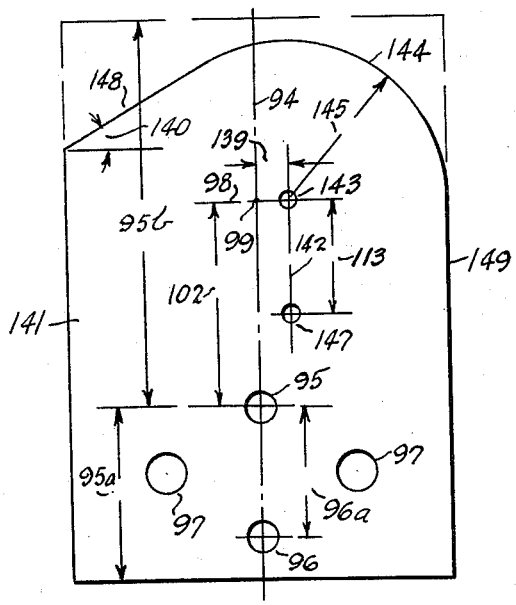
Fig. 15 is a plan view of a cam which may be used for grinding the tool of Fig. 14.

A somewhat simpler type of tool and cam for controlling the grinding thereof are shown in Figs. 14 and 15, but the principle is the same as that described in connection with the tool of Fig. 12 and the cam for controlling grinding of this tool, as shown in Fig. 13. This tool 135 of Fig. 14 comprises a curved corner portion 136 and a straight inclined side edge 137 tangent thereto. In the drawing for this tool the center line 74 is laid out the same as in connection with the tool of Fig. 12 and the transverse apex line 85 is drawn the proper distance 75 from the center of the cam locating dowel pin 58 to locate the zero point 77, and the center 138 of the arc 136 is located on this line at the proper distance 139 from the center line 74. Then a line to indicate the inclined line 137 is drawn tangent to the arc 136 and at the angle 140 to the horizontal. Then in laying out the cam 141, as indicated in Fig. 15, the holes 95 and 96 for the dowel locating pins 58 and 59 on the tool holder are drilled and reamed in the drill jig of Figs. 10 and 11, as previously described, and also the two holes 27 are drilled for the securing screws 60, the longitudinal center line 94 having been scribed on this cam blank as described in connection with Figs. 9 and 13. Then the transverse line 98 may be scribed at the distance 102 from the center of the hole 95 for the dowel locating pin 58 to locate the center or zero point 99 corresponding to the center 77, the same as described in connection with Figs. 12 and 13. Then the line 142 is drawn parallel to the center line 94 at the distance 139 spaced therefrom to correspond with the location of the center 138 on the tool bit and to locate the center of the opening 143 and also the center of the arc 144 to be scribed on the cam blank, with a radius 145 equal to the radius 146 of the arc 136 of the tool plus one inch or the distance 75. Also the second locating hole 147 may be drilled at the proper distance 113 from the hole 143 corresponding to the spacing between the two pins 21 and 22 on the cam generator of Figs. 2 and 4. Also the straight line 148 may be scribed on the blank at the angle 140 corresponding with that of edge 137 on the tool.

Now the edge of this cam may be ground accurately on the grinding machine of Fig. 1 with the use of the cam generator of Figs. 2 to 4 by locating the cam blank with the drilled holes 143 and 147 on the locating pins 21 and 22 and the two stops 34 and 35 set to limit the turning movement of the table 15 against the stops 31 and 32 so that the curve 144 will not be carried beyond the straight side 149, which in this case is parallel to the center line 94, and the inclined straight edge 48 at the angle 140. Thus by properly placing the grinding wheel with respect to this cam generator while on the table 2 of the grinding machine, as previously described, the arc 144 may be accurately ground by turning the table 15. After turning this table counterclockwise until the properly set stop 35 engages the stop 30, the straight edge 149 may be ground by sliding the cam generator laterally to the left on the table 2, it being guided by the bar 13 in the channel 14. Similarly by turning the table to the right or clockwise until the properly located stop 34 engages the stop 29, it completes the arc 144 to the inclined line 148. Then by sliding the cam generator to the right on the table 2, inclined line 148 may be ground at the proper angle.

After this cam is thus completed, it may be mounted on the underside of the tool holder of Figs. 5 to 8, in the same manner as described in connection with the cam 57, and the tool blank for the tool 135 placed in this holder the same as was the blank 48. Then by placing the edge of the cam against the surface 134 of the guide rail 11 the surfaces 136 and 137 of the tool may be ground to correspond with the surfaces 144 and 148 of the cam, as described in connection with the tool of Fig. 12 and the cam of Fig. 13.

Figure 19:
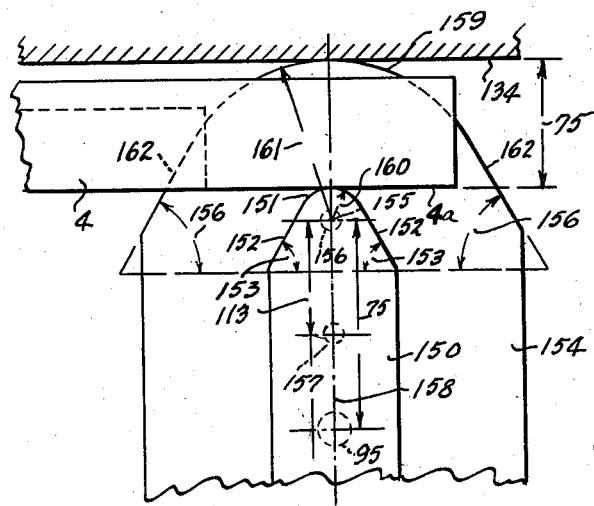
Fig. 19 is a plan view showing diagrammatically the basic control of the grinding of a simple form of tool to illustrate this method.

Fig. 19 is shown to indicate broadly and in a simple manner the principle of forming the controlling edge of the cam a certain size enlarged by a given arbitrarily chosen amount over the cutting end of the tool. In this case this was distance 75, which was taken to be one inch, and this figure shows diagrammatically the relative positions of the guide rail surface 134 and the face 4a of the grinding wheel, while grinding the tool as controlled by the cam, the tool being indicated at 150, having a rounded nose 151 and inclined side edges 152 at about 60 degrees to the horizontal, as indicated by the angles 153. The cam is indicated at 154, and on this cam the center 155 for the dowel locating pin hole 156 and the cooperating pin hole 157 located at the distance 113 therefrom are located on the center line 158, the hole 155 being located the distance 75 from the dowel locating pin hole 95. Then the arc 159 is struck from the center 155 with a radius 161 equal to radius 160 of the arc 151, plus the distance 75, or one inch in the example chosen, and then the inclined side edges 162 drawn tangent to the arc 159 at an angle 153 or 60 degrees to the horizontal to correspond with the inclination of the side edges 152. Then this curved edge 159 and the side edge 162 are ground by placing the blank on the cam generator of Figs. 2 to 4, as previously described, by placing it with the pins 21 and 22 in the openings 156 and 157, and the amount of curve being limited by suitably placing the stops 34 and 35 to permit grinding of the side edges 162. Then this completed cam is placed and secured on the pins 58 and 59 of the tool holder, and the surfaces 151 and 152 of the tool 150 ground by the wheel 4 with the control cam 154 against the surface 134 in the manner described in connection with the other tools.

With this method and associated devices it becomes a simple matter to make the tools since, once the cam has been developed, it is possible to make as many tools as it is wished to, and also to regrind the tools when necessary, and all accurately and in the same manner, to the shape of the control cam used for that particular tool. With this method, when tools are to be reground all the operator needs to do is to get the proper cam from the tool crib, checking it by the required information which is printed on the cam, such as tool number, primary angle, secondary angle and radius.

This method can also be used to salvage old tool bits which by the previous method of grinding have been considered worn out and no longer usable, and thus were previously scrapped. By this method after cutting off the old cutting end of the tool a new cutting end can be readily ground on this end of the shank, or on the opposite end if preferred, thus creating a new tool from the old scrapped tool. Another feature is that in such a tool as that shown in Fig. 14 and the cam of Fig. 15, in which the curved edge 136 and curved cam 134 is in the right hand corner, should a left hand tool of the identical angles and curve be desired, this tool can be formed by merely flipping over the cam of Fig. 15.

In the grinding operation the proper clearance angle on the tool below the top cutting edge may be determined by adjusting the proper angle to the holding member 46 of the tool holder, or by tipping the table 2 of the grinding machine. Also in regrinding these tools the original size and shape may be maintained for the life of the tool bit, because in this grinding operation the tool is shifted toward the grinding wheel, while in the old methods it was common to regrind by grinding off the top of the cutting end of the bit. This, because of the clearance angles on the bit, reduced the size of the cutting edge in each grinding operation, and thus the original size and shape could not be maintained. With this new method when tools are reground all the operator needs to do is to replace the tool in the proper holder, select the proper cam and set the tool in the proper position in the tool set-up block or holder. The only necessary adjustment is to move the wheel forward to the proper spacing from the guide rail 11 in grinding the tool.

Having thus set forth the nature of my invention, I claim:

1. The steps in a method of grinding a tool of the character described provided with a cutting bit including a convexly curved cutting edge, comprising locating on the surface of a cam blank a center with respect to a zero point corresponding to the location of the center of the convex curve to be ground on the cutting edge of the tool with respect to a similar zero point on the tool and drawing the arc of a circle about the center on the cam blank with a radius equal to that for the tool curve plus a predetermined amount, drilling a locating hole in the cam on this center and another locating hole spaced therefrom on a line passing through the center of the first hole and parallel to a line passing through the zero point, providing a cam generator comprising a base and a table pivoted for turning movements on this base and provided with locating pins on this table one of which is on the pivot center for the table and the other spaced therefrom to correspond with the spacing of the locating holes in the cam blank, placing the cam blank on the table with the corresponding pins in the respective locating holes, and grinding the curved edge on the cam blank by turning the table on its pivot while holding the edge of the cam blank against a grinding wheel.

2. The steps in a method of grinding a tool of the character described provided with a cutting bit including a convexly curved cutting edge, comprising making a drawing of the outline of the bit to be ground including a longitudinal center line, a zero point on this line, and the curved edge struck about a center having a definite location with respect to said zero point, locating on this line and spaced a determined distance from the zero point a center for a locating dowel and a center spaced therefrom for a second dowel, scribing on the surface of a cam blank a longitudinal center line and locating a zero point on this line, drilling on this line a pair of dowel locating holes spaced from each other and from the zero point to correspond with those of the dowel centers on the drawing, drilling in the blank a pair of generator locating holes one of which is on a center located with respect to the zero point on the blank to correspond with the center of the curved edge on the drawing with respect to the zero point on this drawing and scribing an arc about the center of this hole of a radius equal to that on the drawing plus the said determined distance between the zero point and the first dowel center on the drawing, providing a cam generator including a pivoted table provided with a pair of locating pins one of which is on said pivot center for the table and the other spaced therefrom to correspond with the generator holes on the cam blank, placing the cam blank on the table with the pins in the latter holes to locate the blank on the table and grinding the curved edge on the blank while holding it against a grinding wheel and turning the table, providing a tool holder with spaced dowel pins corresponding to the dowel holes in the blank and a holding means for the tool blank to be ground with the center lines of the tool and the cam in the same plane, and placing the cam in said holder with the dowel pins in the dowel holes in the cam to locate the cam in the holder.

3. In the art of grinding the cutting edge of a tool bit including a convexly curved edge, the steps including scribing a longitudinal center line on a cam blank and locating a zero point on this line, drilling on this center line and spaced a determined distance from the zero point a dowel locating hole and a second dowel locating hole on this center line spaced from the first hole, inscribing a curved line on the cam blank about a center having a definite location with respect to said zero point and of a radius equal to that of the curved edge of the tool plus the said determined distance between the zero point and said first dowel locating hole, drilling in the blank a pair of spaced generator locating holes one of which is on the center of said curved line, providing a cam generator including a pivoted table provided with a pair of locating pins one of which is on the pivot center for the table and the other spaced therefrom to correspond with the spacing of the generator locating holes on the blank, placing the cam blank on the table with the pins in the generator locating holes, and grinding the curved edge on the blank while holding it against a grinding wheel and turning the table.

4. In the art of grinding the cutting edge of a tool bit, a cam generator for grinding the edge of a control cam to control grinding of the bit, said generator comprising a base adapted to be supported on the horizontal table of a grinding machine including a grinding wheel rotating in a vertical plane above the table, means on the base adapted to cooperate with a guide on the said table to guide the base for longitudinal movement on the table parallel to the grinding face of the wheel, a supporting table pivotally mounted to turn on the base, said supporting table provided with means for supporting a cam blank and means to locate the blank on this table including a pair of spaced locating pins adapted to seat in similarly shaped holes in the cam blank, and one of said pins being coaxial with the pivot for the supporting table.

5. In the art of grinding the cutting edge of a tool bit, a cam generator for grinding the edge of a control cam to control grinding of the bit, said generator comprising a base adapted to be supported on the table of a grinding machine including a grinding wheel, a circular supporting table pivotally mounted to turn on the base, said latter table provided with means for supporting a cam blank and means to locate the blank on this table including a pair of spaced locating pins adapted to seat in similarly spaced holes in the cam blank, one of said pins being coaxial with the pivot for the supporting table, stationary stops located on the base adjacent the periphery of the supporting table on diametrically opposite sides thereof, adjustable stops mounted on the periphery of the supporting table in position to cooperate with the stationary stops to limit opposite turning movements of this table, means mounting the adjustable stops on the supporting table for movement to different angular positions about the periphery of this table, and means to secure the adjustable stops in different adjusted positions on the table.

6. In the art of grinding the cutting edge of a tool bit, a cam generator for grinding the edge of a control cam to control grinding of the bit, said generator comprising a base adapted to be supported on the table of a grinding machine including a grinding wheel, means on the base adapted to cooperate with a guide on the said table to guide the base for longitudinal movement on the table, a supporting table pivotally mounted to turn on the base, said supporting table provided with means for supporting a cam blank comprising a pair of arms extending radially from the table pivot on top of the table and mounted to swing toward and from each other about the table pivot as a center, and means to locate the blank on this table including a pair of spaced locating pins adapted to seat in similarly shaped holes in the cam blank, and one of said pins being coaxial with the pivot for the supporting table.

References Cited in the file of this patent

UNITED STATES PATENTS

| | | |
|---|---|---|
| 2,594,574 | Marsden | Apr. 29, 1952 |
| 2,600,432 | Sanders | June 17, 1952 |
| 2,609,643 | Shelter | Sept. 9, 1952 |
| 2,716,851 | Ulfues | Sept. 6, 1955 |

FOREIGN PATENTS

| | | |
|---|---|---|
| 416,336 | Great Britain | Sept. 11, 1934 |